(12) United States Patent
Scholz et al.

(10) Patent No.: US 8,034,312 B2
(45) Date of Patent: Oct. 11, 2011

(54) PURIFICATION OF PHOSPHORIC ACID RICH STREAMS

(75) Inventors: Reinhard Uwe Scholz, Kerken (DE); Ray Sirey Ruemekorf, Rosmalen (NL)

(73) Assignee: Niro Process Technology B.V., EE's-Hertogenbosch (NL)

( * ) Notice: Subject to any disclaimer, the term of this patent is extended or adjusted under 35 U.S.C. 154(b) by 646 days.

(21) Appl. No.: 12/048,254

(22) Filed: Mar. 14, 2008

(65) Prior Publication Data

US 2008/0226529 A1    Sep. 18, 2008

(30) Foreign Application Priority Data

Mar. 14, 2007   (EP) ..................... 07104140

(51) Int. Cl.
  *C01B 25/16*   (2006.01)
  *B01D 9/00*    (2006.01)
(52) U.S. Cl. ................ 423/321.1; 423/317; 23/295 R
(58) Field of Classification Search ............... 423/321.1
  See application file for complete search history.

(56) References Cited

U.S. PATENT DOCUMENTS

| | | | | |
|---|---|---|---|---|
| 3,620,668 A | * | 11/1971 | Cutter | 423/266 |
| 3,713,802 A | * | 1/1973 | Gittenait | 71/29 |
| 2007/0072402 A1 | * | 3/2007 | Lee et al. | 438/585 |

* cited by examiner

*Primary Examiner* — Emily Le
*Assistant Examiner* — Sarah A Slifka
(74) *Attorney, Agent, or Firm* — Young & Thompson

(57) ABSTRACT

The invention relates to a method for the purification or recovery of orthophosphoric acid rich streams by suspension-based melt crystallization. The orthophosphoric acid is crystallized as the hemi-hydrate form and subsequent separation of such crystals in a wash-column produce a high purity acid/water solution that has been depleted of most of the metals and impurities other than water, thereby separating an orthophosphoric acid rich feed liquor into an ultra-pure orthophosphoric acid hemi-hydrate and a mother liquor containing almost all impurities originally present in the feed. The orthophosphoric acid rich feed liquor typically contains no more than 15 wt % water and 1 wt % other impurities. Individual metal ion composition in the purified orthophosphoric acid product is in the range of 100 to 1000 ppb (parts per billion=$\frac{1}{1000}$ ppm) of each metal ion. The metal ion composition of the resulting purified product is thus typically below the detection limit of typical analysis equipment.

11 Claims, 3 Drawing Sheets

PURIFICATION OF PHOSPHORIC ACID RICH STREAMS

BACKGROUND OF THE INVENTION

This invention relates to a method for the purification or recovery of orthophosphoric acid rich streams. Orthophosphoric acid in water is the common form for most solutions labeled phosphoric acid. The following descriptions may interchangeably use either term. Phosphoric Acid purified in accordance with the method according to the invention is suitable, in particular, for use in the semiconductor industry and in the flat panel display industry (LCD screens) and in other electronics industries, e.g. as etchant. In those applications, the presence of minute amounts of metal ions can already significantly impact the quality of the produced chips and circuit boards.

Ultra pure phosphoric acid is required for various other uses, as well. Its unique ability to resist oxidation, reduction and evaporation makes it particularly useful for high purity industrial and manufacturing processes. As already mentioned above, an important application is the electronics industry, where the phosphoric acid is used to etch away such parts of a photosensitive surface of a wafer that previously have been exposed to ultraviolet light.

During the etching process a significant amount of impurities will be dissolved into the acid etchant solution. The spent etchant from such applications typically contains besides phosphoric acid also nitric acid, acetic acid and the periodic table of various metallic and other impurities including, but not limited to, Na, Mg, Al, Si, K, Ca, Cr, Mn, Fe, Ni, Cu, Zn, Ag, As, Sr, Mo, Cd, Sn, Sb, Au, Pb and Bi. These are all typical of the elements that can be present in the impure acid. Due to the desired reaction between phosphoric acid in this application as an etchant and the metallic parts of the semiconductor product a significant amount of the acid has to be discharged from such process and replaced by fresh acid in order to avoid accumulation of these impurities towards an unacceptable level. Since the tolerable levels are remarkably low it is therefore economically and ecologically attractive to recover such spent acid.

Many different purification processes are known from prior art. The aim is increase the purity level of the orthophosphoric acid beyond those values, which are acceptable for other applications outside the electronics industry. Such known purification processes for higher phosphoric acid grades for use in industrial, food or pharmaceutical applications include solvent extraction, chemical precipitation, absorption, ion exchange methods among others. These known processes have the disadvantage of being complex and are typically limited to a specific impurity or type of impurity meaning the multiple processes must be executed in series to remove all the impurities. They also generate separate waste streams that must be treated separately and as a result are prohibitively expensive.

U.S. Pat. No. 3,991,165 describes an extraction process that preferentially removes the phosphoric acid while leaving other impurities in the raffinate. The final product is not suitable for electronic grade application and the process is relatively complex and requires multiple solvents and complex operation.

Chemical precipitation is another purification method found in literature. These processes are generally limited to a single impurity, require additional reactants and generate waste streams that must be further treated making them complex and expensive to implement.

Absorption methods are also described in literature but these suffer the same restrictions as chemical precipitation.

K. J. Kim and S. Y. Kim have proposed a hybrid process combining distillation and a discontinuous layer crystallization process for the purification of spent phosphoric acid etchants in *Purification of phosphoric acid from waste acid mixtures*, Kwang-Joo Kim, Su-Yeon Kim, Proceeding from the ISIC 2006. Such discontinuous static and dynamic layer crystallization processes are known from the prior art for other chemical applications: e.g. acrylic acid, DMT, para- and meta-Xylene among others. Such layer melt crystallization processes are characterized by relatively high crystal growth rates between $10^{-5}$ m/s and $10^{-6}$ m/s and result in an impure crystal product. The crystal lattice typically would still remain pure, but the surface grows in a dendrite like structure and mother liquor containing all the impurities gets entrapped into the multifaceted structure. It is known that such dynamic impurity inclusion effects become more pronounced with increasing viscosity. For example, the above authors describe that 4 layer melt crystallization steps are required to gradually increase the purity of a crude phosphoric acid from 77, 93% by weight to 89, 73% by weight. The separation of a single layer melt crystallization process can be enhanced by additional purification methods like sweating and washing: these methods offer an increase in purification efficiency at the expense of the product yield.

Suspension-based crystallization has been proposed as purification process as evidenced by EP0209920B1 included herein as reference.

Suspension based crystallization provides a system for continuous operation which allows for a stable seed supply as required in EP0209919B1. The large crystal mass provides a massive growth surface and allows for very slow and near ideal growth rates. The growth surface in suspension based crystallization typically exceeds 5,000 $m^2$ of crystal growth surface per $m^3$ of system volume and can be as high as 20,000 $m^2$ of crystal growth surface per $m^3$ of system volume. This far exceeds the growth surface available in layer type system which is typically limited to <100 $m^2$ of crystal growth surface per $m^3$ of system volume. The massive growth surface in suspension based crystallization allows the production of extremely pure crystals even in the presence of impurities that may become incorporated in the crystal lattice at much faster growth rates. The main problem with suspension crystallization in this application is the high viscosities reported in literature which should hinder the separation of the individual crystals from the impure liquid.

With such high viscosities these processes generally do not achieve the required purification and require, like the layer system, multiple steps to obtain ultra-high purities. Washing steps are included but this uses valuable product and reduces the overall efficiency of the purification step without being able to finally achieve an ultra-pure product. For example, PCT application WO 00/59827 is targeting to achieve a food grade product, only. With a content of the individual metals in the final pure product acid in the ppm range no electronic grade product could be obtained.

BRIEF SUMMARY OF THE PRESENT INVENTION

In general terms, the present invention is accordingly based on mitigating or overcoming the disadvantages arising out of the prior art.

In particular, the invention shall make available a method for the purification or recovery of phosphoric acid rich streams as economically attractive and operationally simple as possible whilst providing high product purity which is required for various applications e.g. in the electronics industry.

The major advantage of crystallization compared to other thermal separation processes as e.g. distillation, is that substantially less energy is required. Furthermore, compared to layer crystallization which is inherently a batch wise operated process, typically the product is only crystallized once, also significantly reducing the amount of energy required.

Furthermore, one of the problems solved by the invention is to make available a method for the purification or recovery of phosphoric acid rich streams, which does not require frequent repetition of multiple batch wise process steps.

In addition, the invention will make available a method of purifying a wash solution, which will allow operation that is as continuous and interruption-free as possible whilst providing efficient separation performance without unacceptable loss of product and will be accordingly highly suitable for large-scale industrial use.

The afore-mentioned problems are solved firstly by the application of an efficient suspension based melt crystallization process to produce a slurry consisting of preferably between 20% and 50% by weight and more preferably between 25% and 35% by weight of orthophosphoric hemi-hydrate crystals.

Suspension based melt crystallization is a process in which a crystalline material is obtained from a liquid feed melt by cooling such melt below it's freezing point. The heat exchanger walls as required for the cooling are typically scraped to prevent accumulation of the crystals in a crystal layer at the wall. Although, typical, we were surprised to find that scraping is not a requirement and a suitable apparatus was reported in EP0209919B1. While scraping is not required, it was found that scraping is an efficient means to avoid the addition of seed crystals as e.g. proposed in EP0209919B1. The inventors were reporting that—like with many other crystallization processes—seeding is required to avoid a large undercooling of the melt and subsequent spontaneous nucleation, which would finally result in a viscous inseparable mass. The combined cooling and scraping action at the crystallizer wall produces sufficient fines as to avoid such addition of seed crystals. It is preferred that the total available surface area for crystal growth is around some 5,000 to 20,000 m$^2$ per m$^3$ of the crystallizer volume.

The obtained crystalline material is kept in suspension by e.g. mixing, providing a large surface area for the growth of the crystals, resulting in a substantially low crystal growth rate and thus pure crystals. The intensity of the mixing can be important and must be sufficient to keep the crystals in suspension and allow complete contact with the liquid mother liquor.

Other suspension based systems will be suitable to combine with the present invention. The suspension based melt crystallization process applied for orthophosphoric acid as is currently used to produce ultra pure organic chemicals from an impure melt as evidenced in e.g. EP1398064B1.

The present invention can also be applied with such other crystallization systems as described in detail in literature and are readily available from various commercial sources. The equipment includes systems such as vessel crystallizers with included growth tanks, exchanger crystallizers with separate growth tanks which may include scraped surface exchangers or other designs that in general allow controlled heat removal to provide a homogenous crystal slurry. Due to the advantageous application of suspension based crystallization which is characterized by extremely slow crystal growth rates the crystalline solid is essentially pure orthophosphoric acid and water. The liquid portion of the slurry, or mother liquor, thus contains orthophosphoric acid, water and the remaining impurities.

The problems as mentioned in the beginning of this chapter are specifically solved by combing the suspension melt crystallization process with a wash column as separation device for the produced crystals. Surprisingly it has been found that despite the high viscosities as present in this application (i) a crystal product could be obtained which is treatable in a wash column and (ii) high purification ratios can be obtained with such wash column device.

Furthermore, the afore-mentioned metal impurities are effectively excluded from the crystal structure so that the solid material is highly purified product. When the mother liquor is completely removed from the surface of the orthophosphoric hemi-hydrate crystals the resulting product is sufficient to meet the requirements mentioned above. The present invention relates to the use of a washing apparatus, a so-called wash column, to effect this separation and is described in detail in EP0920894B1.

The results of the application of the invention are described in the example below in more detail. The various applications of the invention shall, however, not be limited to such working examples, but may be varied with the accompanying claims.

EXAMPLE

In a dedicated pilot plant for suspension based melt crystallization and wash column separation, an impure phosphoric acid melt has been processed in a single step. The impure melt composition is indicated in table 1. The purified phosphoric acid (PPA) composition is also indicated in table 1 and fulfils the pure product specification of metal ion content <1000 ppb.

TABLE 1

| | | Sample analysis | | | |
|---|---|---|---|---|---|
| Sample No. | Sample type | PPA wt % | Al ppb | Fe ppb | Mo ppb |
| 1 | Feed | 85.37 | 5,171 | 2,786 | 5,321 |
| 2 | Purified phosphoric acid | 91.57 | 360 | 224 | 265 |

BRIEF DESCRIPTION OF THE INVENTION

The suspension based melt crystallization system consists of the equipment required to continuously crystallize a valuable component from an impure melt. The process consists of four main components; (a) mixing vessel to suspend the crystals in mother liquor, (b) scraped surface crystallizer to produce the crystals in the mother liquor, (c) optionally an additional mixing vessel to optimize the mixed crystal flow and (d) a wash column for efficient removal of the crystals from the mother liquor. Components (a) and (b) may be combined into a single apparatus without any detrimental effects to the crystallization process.

The specific process is described with reference to FIG. 1.

Figure 1:
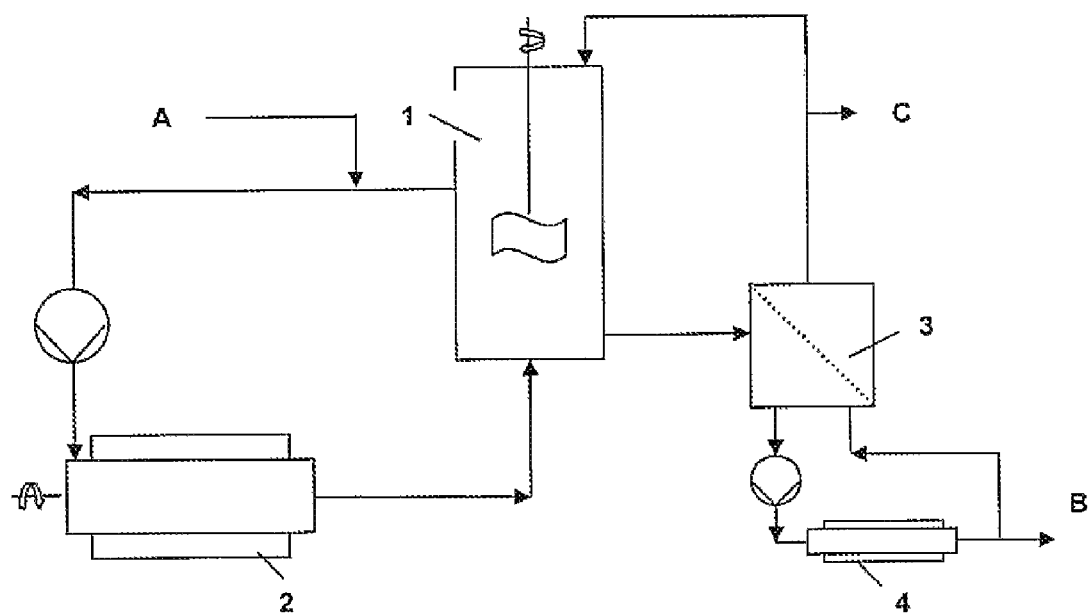
Figure 2:
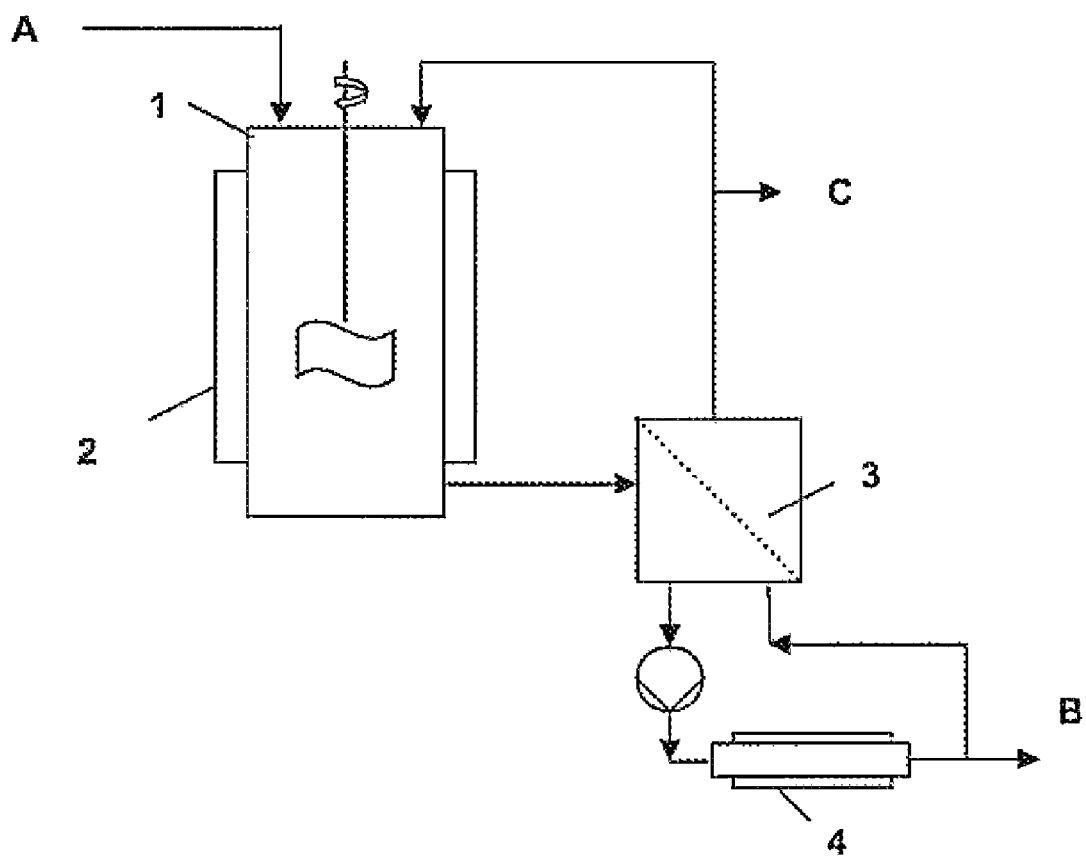
FIG. 2 illustrates an equally advantageous configuration where components (a) and (b) are combined. The specific crystallization apparatus is not the intent of the invention and both systems are readily available in industry.
Figure 3:
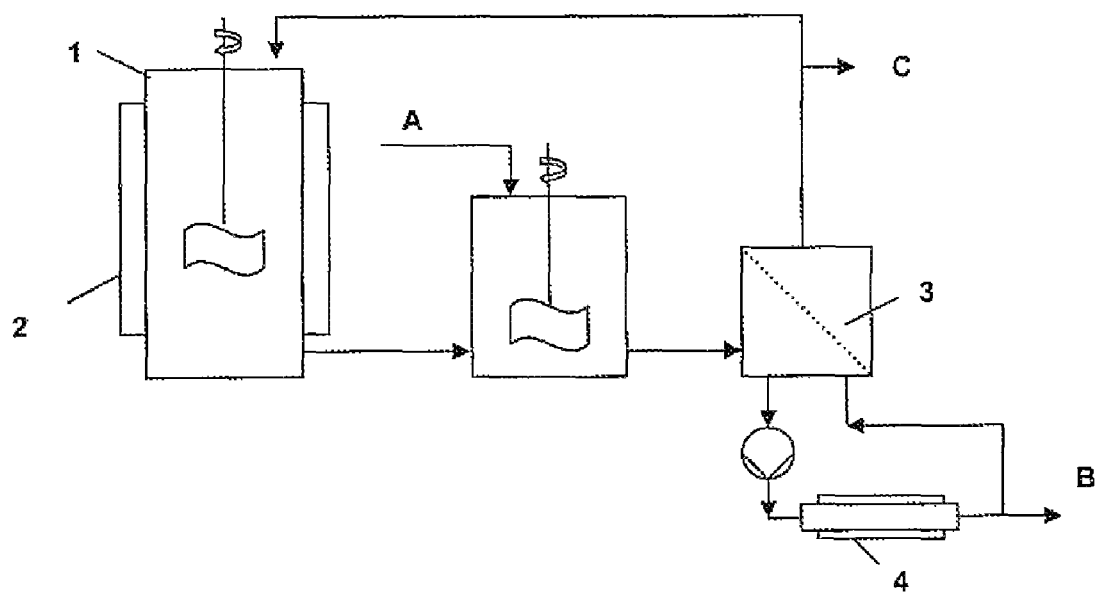
FIG. 3 illustrates the process with the additional mixing vessel mentioned in (c) above.

The orthophosphoric acid feedstock has been mixed with pure water to obtain an orthophosphoric acid rich stream of between 80% and 90% orthophosphoric acid by weight. The remainder being water and <1% by weight other impurities. This crude feed stock (A) is fed to and circulated over the scraped surface crystallizer(s) where coolant is circulated in the outer jacket (2). The scraped surface crystallizer(s) comprises a jacketed vessel containing a rotating scraper assembly to continuously remove the crystals from the cooled wall surface. The scraped surface crystallizer(s) are cooled by a secondary heat transfer liquid like e.g. water, brine, ethylene glycol solution or an evaporating refrigerant such as ammonia or Freon® in the outer jacket or. The exact configuration is not critical and suitable systems are readily available in industry. The process heat is hereby removed from the system by a cooling system like air coolers in case of a secondary heat transfer liquid or a refrigeration system common in industry. The process equilibrium temperature in the scraped surface crystallizer(s) will typically range from −10° C. to +25° C. and preferably +5° C. to +20° C. The mixing vessel(s) (1) are used to suspend the crystal slurry with typically 20% to 50% hemi-hydrate crystals by weight and preferably 25 to 35% crystals by weight in the mother liquor. Surprisingly the intensity of the mixing is not critical and can be maintained at a very low rotational speed of 40 to 100 rpm or just enough to keep the crystal mass from settling to the bottom of the vessel. Again the specific design of the mixing vessel is not the intent of the invention and suitable apparatus are readily available in industry. This amount of crystals provides a massive surface area for crystal growth. High growth surface areas result in very low required growth rates. The very slow growth rates provided by suspension based crystallization ensure that the impurities that would normally be included in the rapidly growing crystal surface are now excluded and remain in the mother liquor and results in sufficiently pure product in the form of the hemi-hydrate of orthophosphoric acid. The crystal volume in the mixing vessel should be sufficient to provide an average crystal residence time in the range of 30 minutes up to 6 hours and preferably in the range of 1 to 2 hours as excessively long residence time increase the complexity and cost of the required equipment. From the mixing vessel(s) the pure crystals suspended in impure mother liquor are fed to one or more wash column(s) (3). The wash column separates the crystals by compressing the slurry and allowing most of the mother liquor to leave through a filter to produce a thickened slurry in the form of a compact crystal bed with between 60% and 90% crystals by weight and preferably 70% to 75% by weight with the remainder being liquid mother liquor containing essentially all of the impurities. The compacted crystal bed is mechanically forced through the column by hydraulic or other mechanical force. The crystal bed is disintegrated and reslurried opposite the original slurry entry point to form a pumpable new slurry in the melter loop (4).

The compact bed is composed of billions of individual crystals and thus forms a porous crystal cake mass within the wash column cylinder. The pressure in the melt loop is controlled by amount of product discharged in stream (B). The pressure in the melt loop (4) is thus controlled to a value higher than in the mixing vessel (1). The open space between the solid hemi-hydrate crystals is initially filled with impure mother liquor. Due to this pressure difference the melted product is forced counter-current to the crystal flow.

The crystals thus enter the wash column at the same temperature as the crystal slurry typically in the range from −10° C. to +27° C. and preferably +5° C. to +−20° C. and most preferably +15 to +20° C. The purified hemi-hydrate product has melting temperature of +29.3° C. As the purified product flows thorough the porous crystal bed it will contact the colder crystal and the purified product will re-crystallize onto the surface of the colder crystals. This recrystallization produces new hemi-hydrate crystalline product form the wash liquid. These new crystals are then carried out with the original crystal mass thus preventing the loss of valuable pure product to the process. The impurities are effectively washed from the surface and totally remain with the mother liquor. The wash column typically uses low pressure steam to melt the crystals in a heat exchanger (4) before discharging the purified product (B).

Because of the relatively slow growth of the crystals, compared to layer crystallization, the impurities present in the liquid are to a very large extent not incorporated into the crystal lattice and remain behind in the mother liquor. Even in a single-stage crystallization process, high-purity crystals of the desired compound are generally obtained.

In the preferred embodiment of the present invention, it has been unexpectedly discovered that the addition of water to the feed as an "artificial" impurity improves the performance of the wash column. Orthophosphoric acid crystals are formed as a hemi-hydrate; where the orthophosphoric acid ($H_3PO_4$) co-crystallizes with water in a fixed ratio of 2 parts orthophosphoric acid and 1 part water commonly written as $H_3PO_4 \cdot \frac{1}{2}H_2O$. The pure hemi-hydrate is thus composed of 91.6% $H_3PO_4$ and 8.4% water by weight. Even though the water affects the equilibrium temperature as an impurity it is actually part of the product and is consumed in the crystallization process. As with other consumables it must be replaced during the process by addition with the feed stock or a separate stream. The affect of the water content is not well understood but may be explained by the following:

1. Unlike the majority of other impurities, the addition of water to the system will decrease the viscosity of the liquid mother liquor. Phosphoric acid solutions are relatively viscous. It is well know that the addition of water will reduce the viscosity of the orthophosphoric acid liquid. The viscosity of high purity orthophosphoric acid in the range of 85% to 91.6% orthophosphoric acid can range from 15 to 70 cSt at ambient temperatures. The viscosity of this liquid is even higher at the lower operating temperature in the crystallizers. For melt crystallization processes a high viscosity has two distinct disadvantages: at first, high viscosities hinder diffusion and therefore typically lower the crystal growth rate significantly. At the same time the nucleation rate is enhanced due to reduced mixing. Both effects result in the production of smaller crystals, which are known to be more difficult to separate from the residual mother liquor than larger ones. Secondly a high mother liquor viscosity is a problem, as such, since a viscous liquid is typically more difficult to separate from a compacted bed of crystal compared to the separation of a diluted liquid. Like with all other crystal-liquid separation devices, also wash column performance in terms of washing efficiency and capacity will decrease with increasing viscosity of the mother liquor.

2. Also by adding water, the equilibrium temperature of the mother liquor will decrease, intensifying the crystal bed wash step as described above in the re-crystallization of pure product in the wash column and subsequently enhancing the stability and purification efficiency of the wash column.

3. The equilibrium temperature of the solution is strongly dependant on the water content where higher water content results in a lower equilibrium temperature. The liquid viscosity is strongly dependant on the water content where higher water content results in a lower viscosity. The viscosity is strongly dependant on the temperature where a lower temperature results in a higher viscosity. It was found that the viscosity at the resulting equilibrium remains remarkably constant and various water contents. The surprising result is that water can be added arbitrarily to achieve the optimum crystallizer temperature and wash column performance without adversely affecting the mother liquor viscosity. It is also important to notice that water is not considered an impurity in the above described uses of electronic grade phosphoric acid.

The invention claimed is:

1. A method for the recovery or ultra-purification of orthophosphoric acid rich feed streams in the absence of solvent crystallization and avoiding multiple discontinuous layer melt crystallization steps, said method comprising the steps of:
   a) Cooling the orthophosphoric acid rich stream below its freezing point to form hemi-hydrate crystals, resulting in a mixed phase slurry of mother liquor and suspended crystals,
   b) Cooling said slurry to create a volume with a crystal content of between 15% and 50% by weight of the hemi-hydrate crystal characterized in that the available surface for crystal growth is not less than 5,000 m$^2$ per m$^3$ of crystallizer volume,
   c) Holding said slurry in a mixing tank to create a crystal residence time between 15 minutes and 4 hours,
   d) Separating said crystals from the mother liquid in a wash column,
   e) Heating a portion of the hemi-hydrate crystals until they are essentially all melted to form a liquid of purified acid and water,
   f) Washing the hemi-hydrate crystals in the wash column, characterized in that the crystals are counter-currently washed by contact with the purified melt of said crystals wherein no wash is lost but is recrystallized on super-cooled crystals,
   g) Discharging the melted hemi-hydrate crystals as purified orthophosphoric acid and water solution, and
   h) Discharging essentially all other impurities in the separated mother liquor.

2. The method of claim 1 for the ultra-purification of orthophosphoric acid rich feed streams in the absence of solvent crystallization and avoiding multiple discontinuous layer melt crystallization steps, said method comprising the further step of:
   prior to said step a) of cooling the orthophosphoric acid rich stream, the addition of water to produce a orthophosphoric acid rich stream with an orthophosphoric acid content between 80% and 90% by weight acid and a total impurity content other than orthophosphoric acid and water of <1%.

3. The method of claim 1, wherein said step b) of claim 1 comprises i) at least one crystal producing step using a first apparatus and ii) at least one crystal conditioning step using a second apparatus.

4. The method of claim 1, wherein said step b) of claim 1 comprises i) at least one crystal producing step and ii) a crystal conditioning step, the at least one crystal producing step and the crystal conditioning step being performed by the same apparatus.

5. The method of claim 3, wherein, an additional mixing vessel is used to optimize the mixed crystal flow to the wash column used in step d) for said separating step, the use of the additional mixing vessel is used for efficient removal of the crystals from the mother liquor.

6. The method of claim 4, wherein, an additional mixing vessel is used to optimize the mixed crystal flow to the wash column used in step d) for said separating step, the use of the additional mixing vessel is used for efficient removal of the crystals from the mother liquor.

7. The method of claim 2, wherein said step b) comprises i) at least one crystal producing step using a first apparatus and ii) at least one crystal conditioning step using a second apparatus.

8. The method of claim 2, wherein said step b) comprises i) at least one crystal producing step and ii) a crystal conditioning step, the at least one crystal producing step and the crystal conditioning step being performed by the same apparatus.

9. The method of claim 1, wherein, in said holding step, the holding of said slurry in the mixing tank to create the crystal residence time is between 30 minutes and 2 hours.

10. The method of claim 1, wherein, in said holding step, the holding of said slurry in the mixing tank to create the crystal residence time is between 30 minutes and 1 hour.

11. The method of claim 2, wherein, in said step of the addition of water to produce the orthophosphoric acid rich stream, the orthophosphoric acid content is between 85% and 90% by weight acid.

* * * * *